US012264021B2

(12) United States Patent
Ozbag

(10) Patent No.: US 12,264,021 B2
(45) Date of Patent: Apr. 1, 2025

(54) CARRYING SYSTEM FOR USE IN DISPLACEMENT OF HAZELNUT

(71) Applicant: BALSU GIDA SANAYI VE TICARET ANONIM SIRKETI, Sakarya (AR)

(72) Inventor: Nusret Ozbag, Sakarya (AR)

(73) Assignee: BALSU GIDA SANAYI VE TICARET ANONIM SIRKETI, Sakarya (TR)

( * ) Notice: Subject to any disclaimer, the term of this patent is extended or adjusted under 35 U.S.C. 154(b) by 0 days.

(21) Appl. No.: 18/280,671

(22) PCT Filed: Jan. 19, 2022

(86) PCT No.: PCT/TR2022/050039
§ 371 (c)(1),
(2) Date: Sep. 7, 2023

(87) PCT Pub. No.: WO2022/250626
PCT Pub. Date: Dec. 1, 2022

(65) Prior Publication Data
US 2024/0308787 A1     Sep. 19, 2024

(30) Foreign Application Priority Data
May 26, 2021 (TR) ............... 2021/008697

(51) Int. Cl.
*B65G 53/16* (2006.01)
*B65G 53/60* (2006.01)
*B65G 53/66* (2006.01)

(52) U.S. Cl.
CPC ............. *B65G 53/16* (2013.01); *B65G 53/60* (2013.01); *B65G 53/66* (2013.01); *B65G 2201/0202* (2013.01)

(58) Field of Classification Search
None
See application file for complete search history.

(56) References Cited

U.S. PATENT DOCUMENTS 3,233,945 A * 2/1966 Kurtz .................... B01J 8/18
406/68
3,714,768 A    2/1973 Patterson
(Continued)

FOREIGN PATENT DOCUMENTS

CN    106429451 A    2/2017
GB      2392895 A    3/2004

OTHER PUBLICATIONS

How Vacuum Conveying Works, 2015, pp. 1-2, Retrieved from: http://technology--vacuumconveyor.blogspot.com/2015/02/how-vacuum-conveying-works.html.

*Primary Examiner* — Joseph A Dillon, Jr.
(74) *Attorney, Agent, or Firm* — Bayramoglu Law Offices LLC

(57) ABSTRACT

A carrying system is provided for use in carrying hazelnut from one location to another location while hazelnut is being processed. The carrying system comprises at least one flow pipe wherein said hazelnut can be carried, at least one blower which can realize air flow in said flow pipe, at least one air lock which can load hazelnut to the flow pipe and at least one separator which can provide separation of hazelnut from the air before discharge of the hazelnut from the flow pipe.

5 Claims, 2 Drawing Sheets

(56) References Cited

U.S. PATENT DOCUMENTS

| | | | | |
|---|---|---|---|---|
| 4,059,310 A * | 11/1977 | Waskiewicz | B65G 53/66 | 406/65 |
| 4,679,704 A * | 7/1987 | Dunlop | B65G 53/66 | 406/14 |
| 4,697,962 A * | 10/1987 | Dunbar | B65G 53/14 | 406/25 |
| 4,787,783 A * | 11/1988 | Girardelli | B65G 53/60 | 406/106 |
| 4,846,608 A * | 7/1989 | Sanders | B65G 53/14 | 406/173 |
| 5,009,551 A * | 4/1991 | Swartz | B65G 53/66 | 406/127 |
| 5,478,172 A * | 12/1995 | Oura | B01F 35/2117 | 406/134 |
| 6,994,497 B1 * | 2/2006 | Eriksson | F23J 3/02 | 406/165 |
| 8,747,029 B2 * | 6/2014 | Thorn | B65G 53/66 | 406/197 |
| 8,905,681 B2 * | 12/2014 | Schneider | B65G 53/06 | 406/173 |
| 9,266,113 B2 * | 2/2016 | Manola | B07B 7/083 | |
| 9,440,802 B2 * | 9/2016 | Moretto | B65G 53/66 | |
| 9,708,138 B2 * | 7/2017 | Veselov | B65G 53/46 | |
| 10,093,492 B2 * | 10/2018 | Brewster | B65G 53/66 | |
| 10,227,185 B2 * | 3/2019 | Hong | B65G 53/52 | |
| 10,647,527 B2 * | 5/2020 | Stark | B65G 53/10 | |
| 10,815,078 B2 * | 10/2020 | Stark | B65G 53/60 | |
| 10,858,201 B2 * | 12/2020 | Berg | B65G 53/24 | |
| 11,066,255 B2 * | 7/2021 | Kramer | B65G 53/40 | |
| 11,084,665 B2 * | 8/2021 | Bullivant | B65G 53/14 | |
| 11,254,520 B2 * | 2/2022 | Stark | B29B 7/826 | |
| 11,365,071 B2 * | 6/2022 | Brewster | B65G 53/24 | |
| 11,890,648 B2 * | 2/2024 | Ozbag | B07B 4/02 | |
| 11,897,709 B2 * | 2/2024 | Kim | B65G 53/24 | |
| 11,958,079 B2 * | 4/2024 | Ozbag | B07B 4/00 | |
| 2005/0130579 A1 * | 6/2005 | Butera | B60H 1/00564 | 454/121 |
| 2022/0009728 A1 * | 1/2022 | Henry | B65G 53/06 | |
| 2023/0381819 A1 * | 11/2023 | Ozbag | B07B 11/06 | |
| 2024/0246706 A1 * | 7/2024 | Ozbag | B65B 25/02 | |
| 2024/0246753 A1 * | 7/2024 | Ozbag | B65D 88/54 | |
| 2024/0253081 A1 * | 8/2024 | Ozbag | B07C 5/342 | |
| 2024/0255342 A1 * | 8/2024 | Ozbag | G01G 13/18 | |

* cited by examiner

CARRYING SYSTEM FOR USE IN DISPLACEMENT OF HAZELNUT

CROSS REFERENCE TO THE RELATED APPLICATIONS

This application is the national phase entry of International Application No. PCT/TR2022/050039, filed on Jan. 19, 2022, which is based upon and claims priority to Turkish Patent Application No. 2021/008697, filed on May 26, 2021, the entire contents of which are incorporated herein by reference.

TECHNICAL FIELD

The present invention relates to at least one carrying system for use in carrying hazelnut from one location to another location while hazelnut is being processed.

BACKGROUND

Hazelnut processing plants include process steps until turning unshelled hazelnut into decorticated hazelnut. These process steps can include breaking, cleaning and packaging of hazelnut. Hazelnut is presented to market after being subjected to breaking and cleaning processes in hazelnut processing plants.

In hazelnut breaking systems, hazelnuts are subjected to various process steps like sieving, breaking, cleaning and packaging. In this case, hazelnut continuously displaces inside the processing plant. In the present art, in hazelnut breaking plants, the hazelnut displaces between process steps thanks to the spiral, elevator and bucket elevator system. These systems can be used in carrying unshelled hazelnut as well as in carrying decorticated hazelnut and roasted hazelnut. In the art, there are some studies for carrying small grained items. These are hereunder described;

The application with number CN106429451A known in the literature relates to a carrying system. Said carrying system has functions like gas-solid two-phase long-distance pneumatic carrying, cyclone separation and dust removal. The invention has main pipeline, roots blower, suctioning device, and automatic control system associated with the suctioning device and which can realize cyclone separation and dust removal.

The application with number U.S. Pat. No. 4,846,608A known in the literature relates to a carrying system. The invention can realize gas-solid two-phase pneumatic carrying. The invention provides carrying of solid grains like corn and soybean with the help of air. Additionally, the application with number CN104210850A known in the literature relates to a carrying system. The invention has pneumatic carrying system for low density brittle grains. The invention has air compressor, cooler dryer and air compressing pipeline. The invention is used in medicine industry in carrying pills and tablets. These literature examples are one each examples related to carrying grained items except hazelnut.

In the hazelnut carrying systems known in the art, there are various problems like undesired breaking of the carried hazelnut during usage of spiral or elevator system, accumulation in the system, problems like pest, excessive length of the line, complexity of the line, and a complete closeness for preventing mechanical problems which occur operationally, and providing carrying the hazelnut in a rapid manner preventing unfavorably affecting of the hazelnut from external factors and in a manner not giving damage to the hazelnut.

As a result, because of the abovementioned problems, an improvement is required in the related technical field.

SUMMARY

The present invention relates to a carrying system, for eliminating the abovementioned disadvantages and for bringing new advantages to the related technical field.

An object of the present invention is to provide a carrying system for use in carrying hazelnut from one location to another location.

Another object of the present invention is to provide a carrying system which provides carrying of hazelnut by means of air way.

In order to realize the abovementioned objects and the objects which are to be deducted from the detailed description below, the present invention is at least one carrying system for use in carrying hazelnut from one location to another location while hazelnut is being processed. Accordingly, the improvement is that the subject matter carrying system comprises at least one flow pipe wherein said hazelnut can be carried, at least one blower which can realize air flow in said flow pipe, at least one air lock which can load hazelnut to the flow pipe, and at least one separator which can provide separation of hazelnut from the air before discharge of the hazelnut from the flow pipe. Thus, hazelnut can easily displace between operation units in hazelnut processing plants.

In a possible embodiment of the present invention, at least one guidance valve is provided which is connected for guiding the hazelnut by advancing hazelnut in different paths on the flow pipe. Thus, hazelnut can be transferred to different sections.

In another possible embodiment of the present invention, at least one sensor is provided which is connected for providing detection of the air pressure which exists in the flow pipe. Thus, the pressure needed by the flow pipe for the transfer can be managed.

In another possible embodiment of the present invention, at least one impeller is provided which is configured to rotate around its own axis on said air lock, said impeller is configured such that one side thereof faces the flow pipe and the other side thereof faces at least one hazelnut chamber in order to be able to realize hazelnut loading. Thus, hazelnut is loaded to the flow pipe by preserving sealing from the outer medium.

In another possible embodiment of the present invention, said separator has cyclone feature for separating hazelnut from air. Thus, hazelnut is separated from the carrying air.

REFERENCE NUMBERS

Figure 1:
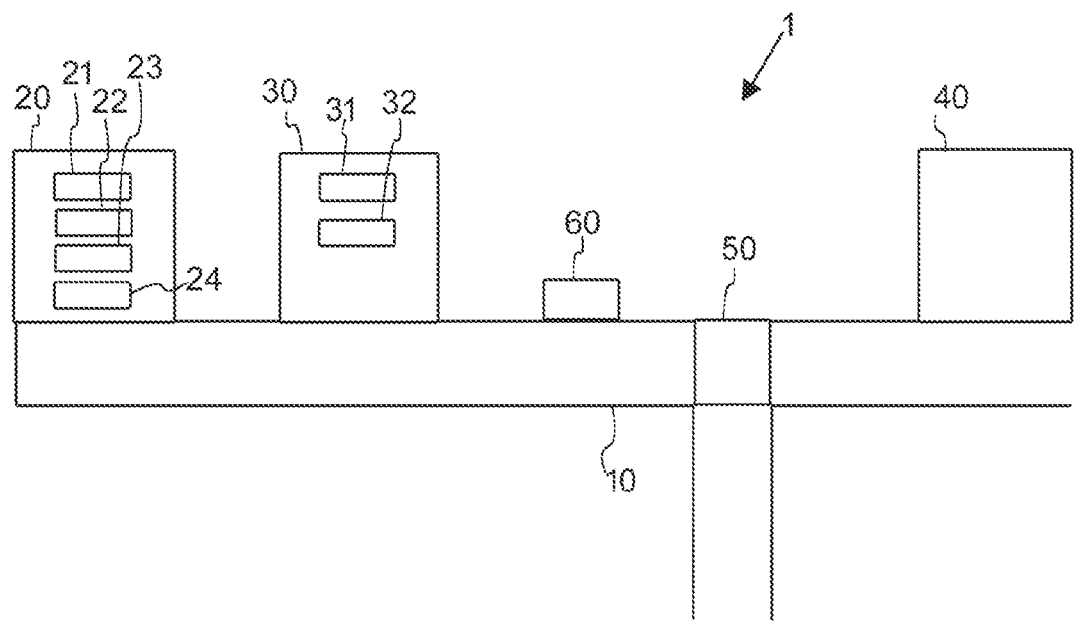
In FIG. 1, a representative schematic view of the subject matter carrying system is given.

1 Carrying system
10 Flow pipe
20 Blower

21 Drive element
22 Fan
23 Sound attenuator
24 Filter
30 Air lock
31 Impeller
32 Chamber
40 Separator
50 Guidance valve
60 Sensor

DETAILED DESCRIPTION OF THE EMBODIMENTS

In this detailed description, the subject matter is explained with references to examples without forming any restrictive effect only in order to make the subject more understandable.

In FIG. 1, a representative schematic view of the subject matter carrying system (1) is given. Accordingly, said carrying system (1) provides carrying of small grained items between predetermined locations. In a possible embodiment of the present invention, this small grained item can be unshelled hazelnut or decorticated hazelnut. The carrying system (1) particularly enables carrying of hazelnut in an aerial manner without needing an additional machine and human power between processing operations of hazelnut in hazelnut processing plants. In order to be able to realize this, there are various components on the carrying system (1) and they operate in a synchronized manner with each other.

There is at least one flow pipe (10) on the carrying system (1). Said flow pipe (10) is connected to a place, where the hazelnut grains exist, from one side, and is connected to a place, whereto the hazelnut grains are desired to be carried, from the other side. The hazelnut is carried in the flow pipe (10). In a possible embodiment of the present invention, the flow pipe (10) is made of A304 quality stainless steel material. Thanks to this, hazelnut can be carried in a firm manner without being affected by any external factor. Additionally, the curve radiuses of elbow parts in the flow pipe (10) are provided in a manner preventing clogging during carrying of hazelnut and preventing the damage which may occur on the product surface.

There is at least one blower (20) on the carrying system (1). The blower (20) is equipment which provides transfer of the air, which exists in the medium subjected to emission, at high flow rate or at low pressure. Said blower (20) is connected to the flow pipe (10). The blower (20) is used in carrying grain products by means of air pressure. There can be at least one drive element (21) and at least one fan (22) on the blower (20). Said drive element (21) can be an electrical motor. The drive element (21) provides drive to the fan (22) and realizes air suction. The blower (20) draws the air, which exists in the medium, by means of vacuum and it compresses said air in the flow pipe (10) and creates a pushing pressure at the outlet. The blower (20) takes the needed air from the outer medium. While doing this, the blower (20) can be connected to at least one filter (24) and at least one sound attenuator (23). Said filter (24) keeps the dust and particles which exist in the air, and provides suctioning of fresh air to the blower (20). Said sound attenuator (23) can be used for reducing the noise which is dependent on carrying air at the inlet and outlet of the blower (20).

Figure 2:
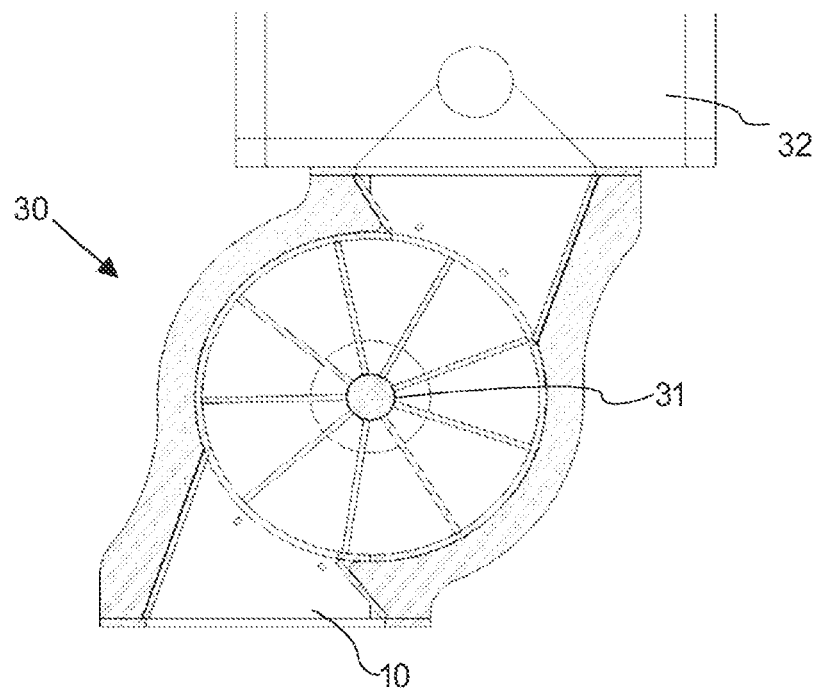
In FIG. 2, a representative lateral view of the air lock, provided in the subject matter carrying system, is given.

In FIG. 2, a representative lateral view of the air lock (30), provided in the subject matter carrying system (1), is given. Accordingly, there is at least one air lock (30) on the carrying system (1). Said air lock (30) feeds the flow pipe (10) with hazelnut. For this reason, the air lock (30) is preferably an OS type air lock (30). At least one impeller (31) is positioned in the air lock (30). Said impeller (31) rotates around itself. By means of this rotational movement, the hazelnut grain is taken from a chamber (32) and is fed to the flow pipe (10) in a sealed manner.

There is at least one guidance valve (50) on the carrying system (1). Said guidance valve (50) is preferably PLC controlled and is used in guiding the flow, which exists in the flow pipe (10), in the desired manner. The guidance valve (50) and the flow pipe (10) have pluralities of duct paths in the hazelnut processing plant, and the hazelnut is guided in these duct paths as desired. At least one sensor (60) is positioned on the carrying system (1). Said sensor (60) provides detection of the air pressure which exists in the flow pipe (10). In order to be able to realize this, in a possible embodiment of the present invention, the sensor (60) can be a pressure sensor. When the sensor (60) senses maximum pressure, the air lock (30) stops hazelnut flow.

There is at least one separator (40) on the carrying system (1). Said separator (40) provides separation of hazelnut grains from the fluid air which exists on the flow pipe (10). In order to realize this, the separator (40) can essentially be a cyclone element. The separator creates a centrifuge air flow therein thanks to this cyclone feature, and as a result of the effect of this spin movement, the particles are separated from air and decomposed.

Figure 3:
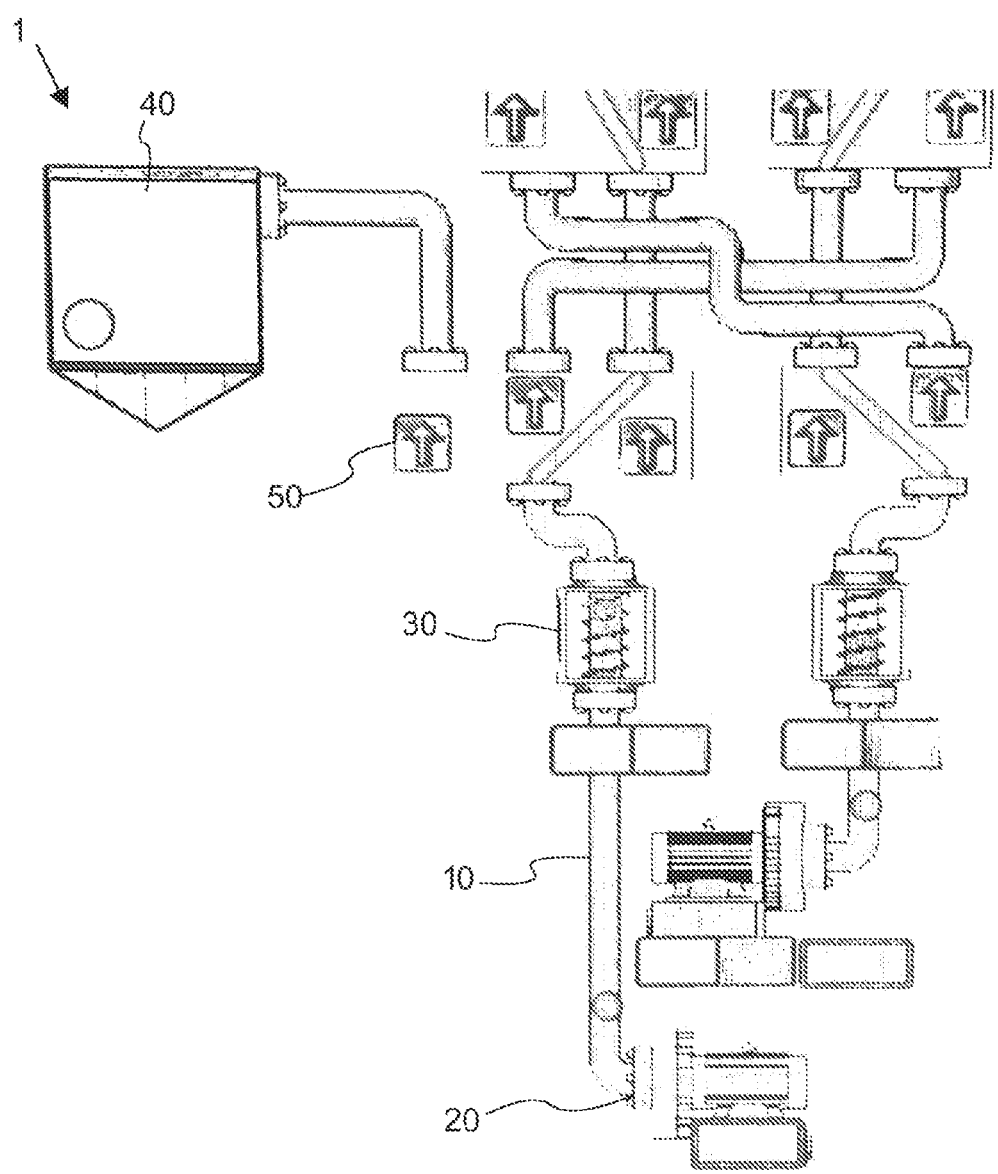
In FIG. 3, a view of a representative usage place of the subject matter carrying system is given.

In FIG. 3, a view of a representative usage place of the subject matter carrying system (1) is given. Accordingly, in a possible usage of the present invention, air flow is provided in the flow pipe (10) by means of the blower (20). Hazelnut is added by means of the air lock (30) into the flow pipe (10) wherein air flow is provided. The added hazelnut is advanced in predetermined manner on the flow pipe (10) by means of the guidance valve (50). Afterwards, by means of the separator (40), the hazelnuts are separated from the air, and the carrying process is completed.

By means of all these embodiments, the unshelled or decorticated hazelnut, processed in the hazelnut processing plant, is carried from one location to another location by means of air way. As hazelnut is carried by means of air way, personnel and labor costs needed during carrying are eliminated. As the carrying process is automated, integrated operation with other automation systems is enabled. Additionally, the amount of carried product can be easily detected by means of weight measurement elements which are to be integrated to the carrying system (1), and full automation of the system can be provided. The unshelled hazelnut stored by means of the carrying system (1) is carried in a manner not leading to risk in terms of the food and in a completely closed manner and in a manner not breaking the hazelnut, in a rapid manner, and in a manner providing protection from external factors during movement of the unshelled hazelnut for breaking process or for storage process.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A carrying system for use in carrying a hazelnut from one location to another location while the hazelnut is being processed, wherein the carrying system comprises:

at least one flow pipe, wherein the hazelnut is allowed be carried, at least one elbow part in the flow pipe, wherein the elbow part is provided in a manner preventing the damage which may occur on the hazelnut surface, at least one blower, wherein the blower is allowed to realize air flow in the flow pipe, at least one air lock, wherein at least one impeller is positioned in the at least one air lock, wherein the air lock is allowed to load the hazelnut to the flow pipe, and at least one separator, wherein the separator is allowed to provide a separation of the hazelnut from the air before a discharge of the hazelnut from the flow pipe.

2. The carrying system according to claim 1, wherein at least one guidance valve is provided, wherein the guidance valve is connected for guiding the hazelnut by advancing the hazelnut in different paths on the flow pipe.

3. The carrying system according to claim 1, wherein at least one sensor is provided, wherein the sensor is connected for providing a detection of an air pressure which, the air pressure exists in the flow pipe.

4. The carrying system according to claim 1, wherein at least one impeller is provided which, wherein the impeller is configured to rotate around its own axis on the air lock, the impeller is configured, wherein a first side of the impeller faces the flow pipe and a second side of the impeller faces at least one hazelnut chamber in order to be allowed to realize hazelnut loading.

5. The carrying system according to claim 1, wherein the separator has a cyclone feature for separating the hazelnut from air.

* * * * *